United States Patent
Otsuka

(10) Patent No.: US 7,492,083 B2
(45) Date of Patent: Feb. 17, 2009

(54) ALKALINE EARTH ALUMINATE PHOSPHOR FOR A COLD CATHODE FLUORESCENT LAMP AND COLD CATHODE FLUORESCENT LAMP

(75) Inventor: Reiji Otsuka, Kanagawa (JP)

(73) Assignee: Kasei Optonix, Ltd., Odawara-shi (JP)

( * ) Notice: Subject to any disclaimer, the term of this patent is extended or adjusted under 35 U.S.C. 154(b) by 245 days.

(21) Appl. No.: 10/901,152

(22) Filed: Jul. 29, 2004

(65) Prior Publication Data
US 2005/0023955 A1  Feb. 3, 2005

(30) Foreign Application Priority Data
Aug. 1, 2003   (JP)   ............................. 2003-285174
Jun. 16, 2004  (JP)   ............................. 2004-178510

(51) Int. Cl.
*H01J 63/04*   (2006.01)
(52) U.S. Cl. ................. 313/486; 313/512; 252/301.4 R
(58) Field of Classification Search .......... 252/301.4 R, 252/301.4 P; 313/486, 512
See application file for complete search history.

(56) References Cited

U.S. PATENT DOCUMENTS

| | | | | |
|---|---|---|---|---|
| 5,227,254 A | * | 7/1993 | Brixner et al. | ............... 428/691 |
| 6,096,243 A | * | 8/2000 | Oshio et al. | ........... 252/301.4 R |
| 7,294,956 B2 | | 11/2007 | Maeda et al. | |
| 2002/0063301 A1 | | 5/2002 | Hanamoto et al. | |
| 2002/0140352 A1 | * | 10/2002 | Sakai et al. | .................. 313/633 |
| 2003/0075705 A1 | * | 4/2003 | Wang et al. | ........... 252/301.4 P |

FOREIGN PATENT DOCUMENTS

| | | |
|---|---|---|
| CN | 1129727 A | 8/1996 |
| EP | 0 697 453 A1 | 2/1996 |
| JP | 52-22836 | 6/1977 |
| JP | 56-152883 | 11/1981 |
| JP | 4-304291 | 10/1992 |
| JP | 8-143863 | 6/1996 |
| JP | 2001-228319 | 8/2001 |
| JP | 2002-171000 | 6/2002 |
| WO | WO 03/032407 A1 | 4/2003 |

OTHER PUBLICATIONS

B.M.J. Smets, et al., Mar. Res. Bull., vol. 21, pp. 1305-1310 (1986).
Handbook of Phosphors, p. 226 (1987).

* cited by examiner

*Primary Examiner*—Toan Ton
*Assistant Examiner*—Hana A Sanei
(74) *Attorney, Agent, or Firm*—Oblon, Spivak, McClelland, Maier & Neustadt, P.C.

(57) ABSTRACT

An alkaline earth aluminate phosphor for a cold cathode fluorescent lamp, which is represented by the compositional formula a $(P_{1-x}Eu_x)O.(Q_{1-y}Mn_y)O.bAl_2O_3$ and which is characterized by emitting light when irradiated with ultraviolet rays having a wavelength of from 180 to 300 nm (provided that in the above formula, P represents at least one alkaline earth metal element selected from Ba, Sr and Ca, Q represents at least one bivalent metal element selected from Mg and Zn, and a, b, x and y represent numbers which satisfy $0.8 \leq a \leq 1.2$, $4.5 \leq b \leq 5.5$, $0.05 \leq x \leq 0.25$ and $0.2 \leq y \leq 0.4$, respectively).

8 Claims, 5 Drawing Sheets

ALKALINE EARTH ALUMINATE PHOSPHOR FOR A COLD CATHODE FLUORESCENT LAMP AND COLD CATHODE FLUORESCENT LAMP

BACKGROUND OF THE INVENTION

1. Field of the Invention

The present invention relates to an alkaline earth aluminate phosphor for a cold cathode fluorescent lamp, which exhibits green emission with high luminance with emission in a blue wavelength region suppressed by ultraviolet rays having a wavelength of from 180 to 300 nm, with little decrease in emission luminance due to heat (heat deterioration), and a cold cathode fluorescent lamp which employs the above phosphor as a fluorescent layer, which has a high luminous flux and which realizes a beautiful display screen with a wide color reproduction range when used for a back light of e.g. a liquid crystal display.

2. Discussion of Background

In recent years, diffusion of flat panel displays (FPD) represented by liquid crystal displays (LCD) and plasma displays (PDP) is remarkable. FPD is classified into so-called light emitting displays such as PDP in which picture elements constituting an image on the panel themselves emit light, and non-light emitting displays such as LCD in which picture elements constituting an image on the panel themselves do not emit light and are combined with a back light. In LCD, an image is constituted on the panel by combination of a back light and a liquid crystal shutter, and a color filter is further combined to make color display of the image possible.

In recent years, the application of LCD is rapidly spreading to applications which requires color image display such as monitors and televisions, in addition to conventional applications to displays for personal computers. In such applications, it is very important to faithfully reproduce the color of the projected image, and the color reproduction range at least equal to a color cathode ray tube (CRT) is becoming necessary.

For a back light to be used for LCD, a cold cathode fluorescent lamp is mainly used, and in recent years, instead of a fluorescent lamp having a fluorescent layer comprising a single component phosphor of a halophosphate phosphor, a fluorescent lamp of three-wavelength type comprising as a fluorescent layer a phosphor with an emission spectrum having an intense peak with a narrow half value width in the vicinity of each of wavelength regions of 450, 540 and 610 nm, is rapidly spreading. However, as the phosphor for a three-wavelength type fluorescent lamp, particularly a green phosphor, a phosphor having an emission spectrum with agrees with the relative visibility intended to be used for lighting has been developed, and the phosphor developed to be used for lighting has been used as it is also for a cold cathode fluorescent lamp to be used for a back light of e.g. LCD. Accordingly, if the cold cathode fluorescent lamp is used for a back light of LCD as it is, even if it has a high luminous flux, the color reproduction range tends to be narrow, and if the thickness of the color filter of LCD is increased as a countermeasure, although the color reproduction range widens, the transmittance tends to be low, and luminance of LCD tends to decrease. Accordingly, development of a cold cathode fluorescent lamp which has a high luminous flux and with which the color reproduction range becomes wide when used for a back light of e.g. LCD has been desired.

Heretofore, as a green phosphor of a fluorescent lamp for lighting, a lanthanum phosphate phosphor (LAP phosphor) co-activated with trivalent cerium ($Ce^{3+}$) and trivalent terbium ($Tb^{3+}$) has been mainly used, however, JP-A-2001-228319 discloses that when a light source using as a fluorescent layer a bivalent manganese ($Mn^{2+}$)-activated zinc silicate type phosphor (such as $Zn_2SiO_4$: Mn), a bivalent europium ($Eu^{2+}$) and bivalent manganese ($Mn^{2+}$)-co-activated barium magnesium aluminate type phosphor (such as $BaMg_2Al_{16}O_{27}$: Eu, Mn) or a $Mn^{2+}$-activated magnesium gallate type phosphor (such as $MgGaO_4$: Mn), having an emission peak in a wavelength region of from 500 to 540 nm, is used as a back light of e.g. LCD, a beautiful display screen equal to a conventional color CRT which is bright and has a wide color reproduction range can be realized.

However, the $Mn^{2+}$-activated zinc silicate type phosphor and the $Mn^{2+}$-activated magnesium gallate type phosphor do not exhibit green emission with high luminance which can be practically used by ultraviolet rays by discharge of mercury, and if they are used as a fluorescent layer of a fluorescent lamp, the lamp luminous flux decreases with time due to reaction with mercury or ion impact, and thus they are not practically used yet.

On the other hand, the $Eu^{2+}$ and $Mn^{2+}$-co-activated alkaline earth aluminate phosphor exhibits green emission with high color purity highly efficiently by sensitization by $Eu^{2+}$. This is because when excited by ultraviolet rays having a wavelength of from 180 to 300 nm, $Eu^{2+}$ absorbs the ultraviolet rays and transfers the energy to $Mn^{2+}$, whereby visible light is emitted. This phosphor has been often used practically as a phosphor of a fluorescent lamp for lighting or for copying machine, however, further development has been required since degree of heat deterioration of the phosphor is slightly high.

Further, JP-A-56-152883 proposes an aluminate phosphor comprising magnesium and barium and co-activated with $Eu^{2+}$ and $Mn^{2+}$, having a compositional formula of $0.7BaO.MgO.8Al_2O_3$:0.05Eu, 0.2Mn for example, as a phosphor for copying machine. However, the phosphor has an emission spectrum having a first emission peak at a wavelength of 470 nm and a second emission peak at a wavelength of 510 nm when irradiated with ultraviolet rays, and when a cold cathode fluorescent lamp comprising this phosphor as a fluorescent layer is used as a back light of LCD, although the color reproduction range of green becomes wide, the color reproduction range of blue becomes narrow.

Further, JP-B-52-22836 discloses that an alkaline earth aluminate phosphor co-activated with $Eu^{2+}$ and $Mn^{2+}$, represented by the compositional formula $Ba_{0.9}Eu_{0.1}Mg_{1.8}Mn_{0.2}Al_{16}O_{27}$ for example, is useful as a phosphor for a fluorescent lamp. However, this phosphor tends to deteriorate in a baking step when a fluorescent layer is formed, and the luminous flux tends to decrease with time.

Still further, JP-A-4-304291 proposes a $Eu^{2+}$ and $Mn^{2+}$-co-activated barium magnesium aluminate phosphor as a phosphor to improve color rendering properties at the minimum sacrifice of brightness of a three-wavelength type fluorescent lamp. This phosphor exhibits emission having an emission spectrum having a first emission peak in a wavelength region of from 445 to 455 nm and a second emission peak in a wavelength region of from 510 to 520 nm, however, the intensity of the second emission peak is low as compared with the first emission peak, such being insufficient as a green phosphor.

Further, the phosphors as disclosed in JP-A-56-152883 and JP-B-52-22836 also exhibit emission with two peaks in the emission spectrum, however, the intensity of the second emission peak in a wavelength region of from 500 to 540 nm is low as compared with the first emission peak in the wavelength region of from 430 to 490 nm, such being insufficient as a green phosphor.

In FIG. 2, an emission spectrum (curve A) and a spectral transmission spectrum of a green filter (curve C) when a conventional $Eu^{2+}$ and $Mn^{2+}$-co-activated alkaline earth aluminate phosphor (conventional aluminate phosphor) having a compositional formula of $\{(Ba_{0.95}Eu_{0.05}) \cdot Mg_{0.99}Mn_{0.01}) O \cdot 5Al_2O_3\}$ is excited by ultraviolet rays of 253.7 nm are shown. The intensity of emission in a wavelength region of from 430 to 490 nm is high as compared with the intensity of emission in a wavelength region of from 500 to 540 nm, and matching with the spectral transmission spectrum of a green filter is poor.

As mentioned above, when a cold cathode fluorescent lamp comprising as a fluorescent layer the conventional $Eu^{2+}$ and $Mn^{2+}$-co-activated alkaline earth aluminate phosphor is used as a back light of color LCD, the emission intensity in a blue wavelength region tends to be high as compared with the emission in a green wavelength region, and thus matching of emission of the phosphor with the spectral transmission spectrum of a green filter of the color LCD tends to be poor, and accordingly brightness and color purity of the color LCD tend to decrease.

Further, of the conventional alkaline earth aluminate phosphor, the crystal structure and the emission properties vary depending upon the composition proportion of the oxide of the alkaline earth and aluminum oxide constituting the matrix, and thus it is difficult to say that the above phosphor of a known composition is suitable for a fluorescent layer of a cold cathode fluorescent lamp.

Still further, such a $Eu^{2+}$ and $Mn^{2+}$-co-activated alkaline earth aluminate phosphor provides a lower emission luminance than the LAP phosphor which has conventionally been used, and a cold cathode fluorescent lamp using this phosphor as a fluorescent layer has a low luminous flux as compared with a cold cathode fluorescent lamp using the LAP phosphor as a fluorescent layer.

A cold cathode fluorescent lamp emits visible light by excitation of a phosphor by ultraviolet rays radiated from mercury, and is characterized in that the lamp tube diameter is smaller than that of a fluorescent lamp for lighting and the bulb wall load is high. Further, of a fluorescent lamp for lighting, the ultraviolet rays radiated from mercury are mainly ones having a wavelength of 253.7 nm, and influence of ultraviolet rays having a wavelength of 185 nm can be ignored, however, of a cold cathode fluorescent lamp, influence of ultraviolet rays having a wavelength of 185 nm, in addition to ultraviolet rays having a wavelength of 253.7 nm, can not be ignored. However, no studies have been disclosed regarding emission properties when the $Eu^{2+}$ and $Mn^{2+}$-co-activated alkaline earth aluminate phosphor is excited by ultraviolet rays having a wavelength of 185 nm. Further, in the cold cathode fluorescent lamp, the density of ultraviolet rays to be irradiated on the fluorescent screen tends to be high as compared with a fluorescent lamp for lighting, and the phosphor is likely to undergo luminance saturation. Thus, the activator concentration is preferably as high as possible within a range not causing concentration quenching, however, no studies have been disclosed regarding this point.

SUMMARY OF THE INVENTION

Under these circumstances, the present invention has been made to provide a $Eu^{2+}$ and $Mn^{2+}$-co-activated alkaline earth aluminate phosphor for a cold cathode fluorescent lamp, which exhibits high emission intensity in a green wavelength region as compared with a blue wavelength region when irradiated with ultraviolet rays having a wavelength of from 180 to 300 nm, with high luminance equal to a LAP phosphor, with little heat deterioration, and a cold cathode fluorescent lamp comprising this phosphor as a fluorescent layer which has a high luminous flux and which widens the color reproduction range of green when used as a back light of e.g. LCD.

In order to achieve the above object, the present inventor has conducted extensive studies on, regarding a $Eu^{2+}$ and $Mn^{2+}$-co-activated alkaline earth aluminate phosphor, the correlation of the composition such as the proportion of the oxide of the alkaline earth and aluminum oxide constituting the matrix and the contents of Eu and Mn as activators, with emission properties such as emission luminance and the degree of heat deterioration, and analyzed the behavior in detail.

As a result, he has found an unexpected fact. That is, as a means to decrease and suppress emission in a blue wavelength region by $Eu^{2+}$ harmful in view of luminance and color purity, it is considered favorable to reduce the emission center by $Eu^{2+}$ considered to be harmful (that is, to reduce the $Eu^{2+}$ concentration) based on a conventional idea, however, the emission intensity in a green wavelength region of from 510 to 520 nm is strengthened by increasing the $Eu^{2+}$ concentration on the contrary, and the emission in a blue wavelength region decreases and as a result, a phosphor which exhibits emission with favorable matching with the spectral transmission spectrum of a green filter can be obtained. Further, it has also been found that by defining the constitution of the matrix composition and the concentration of Mn under such conditions, properties such as emission luminance and little heat deterioration can be improved.

They have further found that when such a phosphor is used as a fluorescent layer of a cold cathode fluorescent lamp, a cold cathode lamp having a high luminous flux can be obtained, and when this is used as a back light of e.g. LCD, a display screen with a wide color reproduction range can be obtained, and the present invention has been achieved.

Namely, the present invention provides the following constructions.

(1) An alkaline earth aluminate phosphor for a cold cathode fluorescent lamp, which is represented by the compositional formula a $(P_{1-x}Eu_x)O \cdot (Q_{1-y}Mn_y)O \cdot bAl_2O_3$ and which is characterized by emitting light when irradiated with ultraviolet rays having a wavelength of from 180 to 300 nm (provided that in the above formula, P represents at least one alkaline earth metal element selected from Ba, Sr and Ca, Q represents at least one bivalent metal element selected from Mg and Zn, and a, b, x and y represent numbers which satisfy $0.8 \leq a \leq 1.2$, $4.5 \leq b \leq 5.5$, $0.05 \leq x \leq 0.25$ and $0.2 \leq y \leq 0.4$, respectively).

(2) The alkaline earth aluminate phosphor for a cold cathode fluorescent lamp according to the above (1), characterized by emitting light having a first emission peak in a wavelength region of from 445 to 455 nm and having a second emission peak in a wavelength region of from 510 to 520 nm, when irradiated with ultraviolet rays having a wavelength of from 180 to 300 nm.

(3) The alkaline earth aluminate phosphor for a cold cathode fluorescent lamp according to the above (1) or (2), characterized in that when the intensity of the above first emission peak and the intensity of the above second emission peak are represented as P1 and P2, respectively, the intensity ratio (P2/P1) is at least 10.

(4) An alkaline earth aluminate phosphor for a cold cathode fluorescent lamp, which comprises an alkaline earth aluminate as a matrix and contains bivalent europium ($Eu^{2+}$) and bivalent manganese ($Mn^{2+}$) as activators, and which is characterized in that when excited by ultraviolet rays having a wavelength of 253.7 nm, the emission luminance after the phosphor is subjected to a heat treatment at 650° C. for 15 minutes is at least 80% of the emission luminance before the heat treatment.

(5) The alkaline earth aluminate phosphor for a cold cathode fluorescent lamp according to the above (4), characterized in that the phosphor is represented by the compositional formula a $(P_{1-x}Eu_x)O \cdot (Q_{1-y}Mn_y)O \cdot bAl_2O_3$ (provided that P represents at least one alkaline earth metal element selected from Ba, Sr and Ca, Q represents at least one bivalent metal element selected from Mg and Zn, and a, b, x and y represent numbers which satisfy $0.8 \leq a \leq 1.2$, $4.5 \leq b \leq 5.5$, $0.05 \leq x \leq 0.25$ and $0.2 \leq y\ 0.4$, respectively).

(6) A cold cathode fluorescent lamp, which comprises a tubular envelop transparent to light, a fluorescent layer formed on the inner wall of the envelop, and mercury and rare gas sealed in the envelop so that the fluorescent layer emits light by ultraviolet rays having a wavelength of from 180 to 300 nm radiated by discharge of mercury, and which is characterized in that the fluorescent layer contains the alkaline earth aluminate phosphor for a cold cathode fluorescent lamp as defined in any one of the above (1) to (5).

DETAILED DESCRIPTION OF THE PREFERRED EMBODIMENTS

Figure 1:
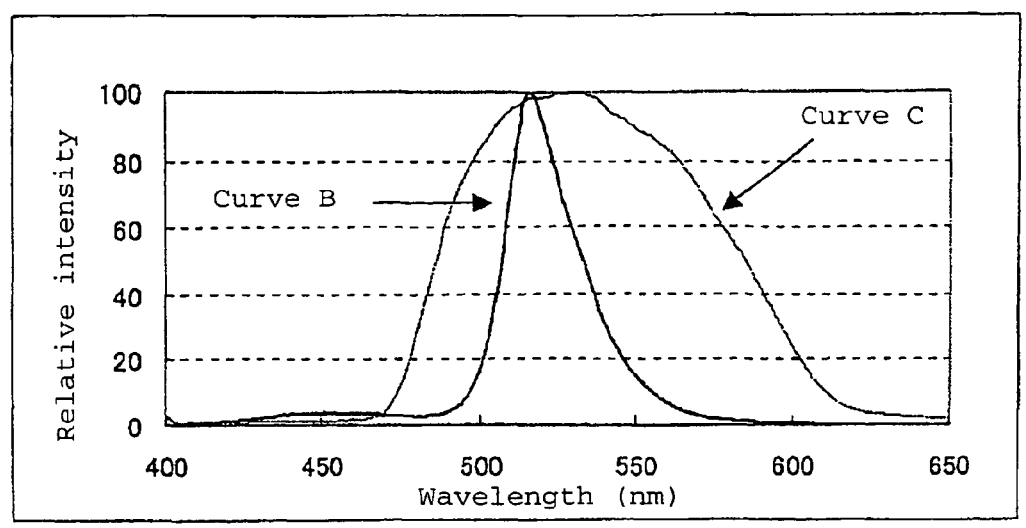
FIG. 1 is a figure illustrating the correlation of an emission spectrum (curve B) with a spectral transmission spectrum (curve C) of a green filter of the $Eu^{2+}$ and $Mn^{2+}$-co-activated barium magnesium aluminate phosphor of the present invention.

The alkaline earth aluminate phosphor for a cold cathode fluorescent lamp of the present invention has the above construction, and accordingly, the emission intensity in a blue wavelength region of from 445 to 455 nm is low as different from a conventional phosphor and the emission intensity in a wavelength region of from 510 to 520 nm is high. Accordingly, the matching of emission of the phosphor with the spectral transmission spectrum of a green color filter is improved, color purity of green is favorable as compared with a conventional green phosphor for a fluorescent lamp represented by a LAP phosphor, and further, high luminance equal to that of a LAP phosphor is exhibited under excitation by ultraviolet rays having a wavelength of from 180 to 300 nm, particularly ultraviolet rays of 253.7 nm and 185 nm, and in addition, the degree of heat deterioration is low and high luminance can be maintained even after a heat treatment. Accordingly, when the phosphor of the present invention is used for a fluorescent layer as a green phosphor component of a cold cathode fluorescent lamp, a lamp having a high luminous flux can be obtained, and when the lamp is used as a back light of e.g. LCD, a bright and beautiful display screen with a wide color reproduction range can be realized.

The $Eu^{2+}$ and $Mn^{2+}$-co-activated alkaline earth aluminate phosphor for a cold cathode fluorescent lamp of the present invention (hereinafter sometimes referred to simply as the aluminate phosphor of the present invention or the phosphor of the present invention) can be produced in the same manner as the production of a conventional $Eu^{2+}$ and $Mn^{2+}$-co-activated alkaline earth aluminate phosphor (hereinafter sometimes referred to simply as a conventional aluminate phosphor or a conventional phosphor) except that phosphor materials are blended and adjusted to achieve a predetermined composition.

Namely, the aluminate phosphate of the present invention can be produced by such a method that phosphor material compounds comprising a mixture of 1) an oxide of P, or a compound of P which can be converted to the oxide of P at a high temperature such as a nitrate, a sulfate, a carbonate, a halide or a hydroxide of P, 2) an oxide of Q, or a compound of Q which can be converted to the oxide of Q at a high temperature such as a nitrate, a sulfate, a carbonate, a halide or a hydroxide of Q, 3) an oxide of Al, or a compound of Al which can be converted to the oxide of Al at a high temperature such as a nitrate, a sulfate, a carbonate, a halide or a hydroxide of Al, 4) an oxide of Eu, or a compound of Eu which can be converted to the oxide of Eu at a high temperature such as a nitrate, a sulfate, a carbonate, a halide or a hydroxide of Eu, and 5) an oxide of Mn, or a compound of Mn which can be converted to the oxide of Mn at a high temperature such as a nitrate, a sulfate, a carbonate, a halide or a hydroxide of Mn, in such proportions as to stoichiometrically bring the composition to a $(P_{1-x}Eu_x)O \cdot (Q_{1-y}Mn_y)O \cdot bAl_2O_3$ (provided that P represents at least one alkaline earth metal element selected from Ba, Sr and Ca, Q represents at least one bivalent metal element selected from Mg and Zn, and a, b, x and y represent numbers which satisfy $0.8 \leq a \leq 1.2$, $4.5 \leq b \leq 5.5$, $0.05 \leq x \leq 0.25$ and $0.2 \leq y \leq 0.4$, respectively. The same applies hereinafter.), is packed in a heat resistant container and baked in a neutral gas atmosphere of e.g. an argon gas or a nitrogen gas or in a reducing atmosphere of e.g. a nitrogen gas containing a small amount of a hydrogen gas or a carbon monoxide gas at from 1,200 to 1,700° C. once or several times.

Further, when the above phosphor material compounds are baked, a compound containing fluorine or a compound containing boron may further be added as a flux to the material compounds, followed by baking. The method for producing the phosphor of the present invention is not limited to the above method, and the phosphor of the present invention can be produced by any conventional method so long as the composition is within a range of the above stoichiometrical composition.

In FIG. 1, an emission spectrum (curve B) when a phosphor having a compositional formula of $((Ba_{0.85}Eu_{0.15})\cdot(Mg_{0.65}Mn_{0.35})O\cdot 5Al_2O_3)$ which is one of the aluminate phosphors of the present invention produced as described above, is excited by ultraviolet rays of 253.7 nm, and a spectral transmission spectrum of a green filter (curve C) are shown.

Figure 2:
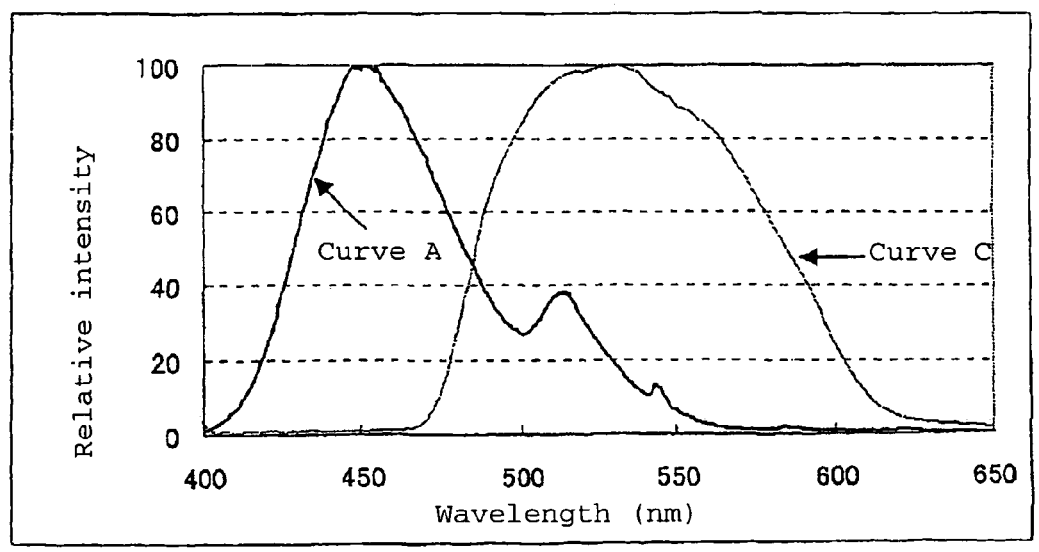
FIG. 2 is a figure illustrating the correlation of an emission spectrum (curve A) with a spectral transmission spectrum (curve C) of a green filter of a conventional $Eu^{2+}$ and $Mn^{2+}$-co-activated barium magnesium aluminate phosphor.

As evident from comparison with the emission spectrum of a conventional aluminate phosphor as shown in FIG. 2, of the aluminate phosphor of the present invention, emission in a blue wavelength region in a wavelength region of from 445 to 455 nm is reduced as compared with the conventional aluminate phosphor, and on the contrary, emission in a green wavelength region in a wavelength region of from 510 to 520 nm is strengthened, and the matching of the emission spectrum with the spectral transmission spectrum of a green filter is very good. Accordingly, in the case of the aluminate phosphor of the present invention, when it is combined with the same green filter, loss of emission due to absorption of the blue emission by the green filter from the phosphor decreases as compared with the case of the conventional aluminate phosphor, and emission luminance and color purity through the filter remarkably improve.

Now, with reference to a $Eu^{2+}$ and $Mn^{2+}$-co-activated barium magnesium aluminate phosphor represented by the compositional formula a $(Ba_{1-x}Eu_x)O\cdot(Mg_{1-y}Mn_y)O\cdot bAl_2O_3$ as an example, results of studies on the correlation of the matrix composition of the phosphor and the concentration of the activators (Eu and Mn) with the emission luminance, the degree of heat deterioration and the relative intensity of the respective emission intensities in the two specific wavelength regions (the ratio of the emission intensity of the green component to the emission intensity of the blue component) are shown below.

In the above compositional formula, the number of mols of barium europium oxide $\{(Ba_{1-x}Eu_x)O\}$ and the number of mols of aluminum oxide per 1 mol of magnesium manganese oxide $\{(Mg_{1-y}Mn_y)O\}$ are a and b, respectively, and the number of mols of Eu per 1 mol of barium europium oxide $\{(Ba_{1-x}Eu_x)O\}$ and the number of mols of Mn per 1 mol of magnesium manganese oxide $\{(Mg_{1-y}Mn_y)O\}$ are x and y, respectively. The relative emission luminance as mentioned hereinafter is a relative value when the emission luminance of a conventional LAP phosphor which is a green phosphor for a fluorescent lamp having an emission peak at 543 nm and which is represented by the compositional formula $(La_{0.55}Ce_{0.3}Tb_{0.15})PO_4$ when excited by ultraviolet rays of 253.7 nm is rated to be 100.

Figure 3:
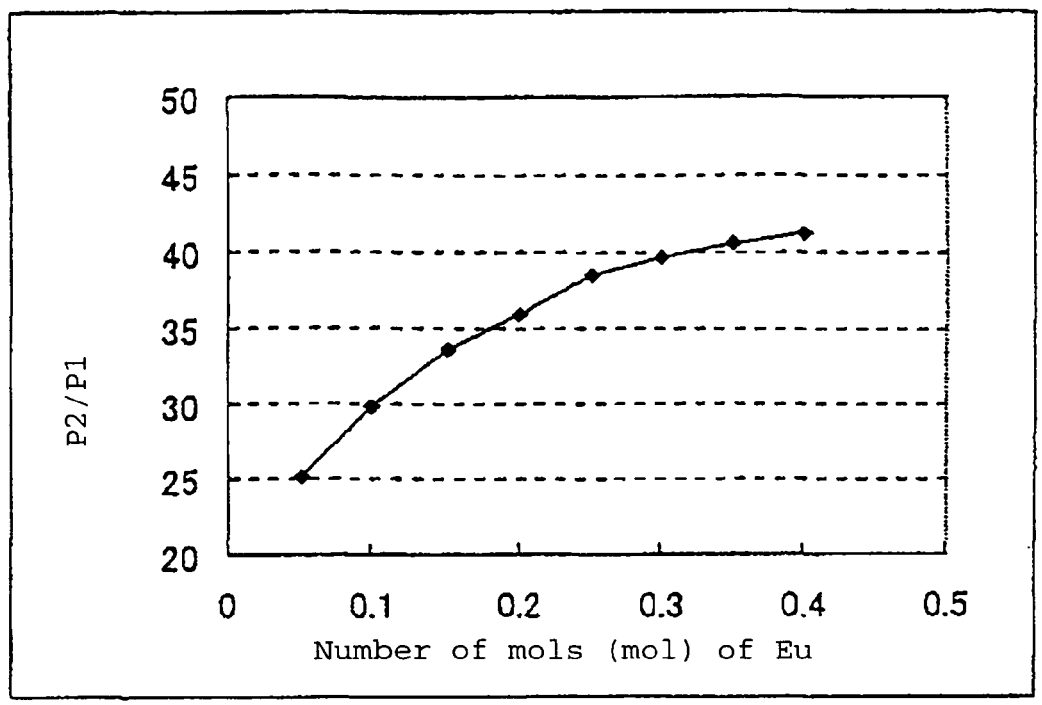
FIG. 3 is a figure illustrating the correlation of the ratio (P2/P1) of the emission peak intensity (P2) in a wavelength region of from 510 to 520 nm to the emission peak intensity (P1) in a wavelength region of from 445 to 455 nm, in an emission spectrum of a $Eu^{2+}$ and $Mn^{2+}$-co-activated barium magnesium aluminate phosphor, with the Eu concentration.

In FIG. 3, a graph illustrating, with reference to a $Eu^{2+}$ and $Mn^{2+}$-co-activated barium magnesium aluminate phosphor $\{(Ba_{1-x}Eu_x)O\cdot(Mg_{0.65}Mn_{0.35})O\cdot 5Al_2O_3\}$ wherein the Mn concentration is 0.35 mol (y=0.35), barium europium oxide is 1 mol (a=1) and aluminum oxide is 5 mol (b=5) as an example, the relation between the Eu concentration (x value) and the intensity ratio (P2/P1) of two peaks indicating color purity or goodness of the matching properties with a green color filter, when the intensity of a first emission peak in a wavelength region of from 445 to 455 nm is represented as P1 and the intensity of a second emission peak in a wavelength region of from 510 to 520 nm is represented as P2, in the emission spectrum of the phosphor, is shown.

As evident from FIG. 3, with respect to the intensity ratio (P2/P1) of these two peaks of the bivalent $Eu^{2+}$ and $Mn^{2+}$-co-activated barium magnesium aluminate phosphor, contrary to expectation that blue emission (P1) will increase when the Eu concentration as the source of the blue emission center $Eu^{2+}$ is increased higher than the Eu concentration of about 0.05 mol which has been studied in a conventional aluminate phosphor, P1 decreases practically and as a result, the intensity ratio (P2/P1) increases.

The intensity ratio (P2/P1) is at least 25 at a Eu concentration of at least 0.05 mol (x≧0.05), and the higher the Eu concentration, the higher the intensity ratio. This phenomenon is estimated to be because the energy transfer from Eu to Mn tends to be easy when the Eu concentration is high. As a result, the emission intensity (P2) in a wavelength region of from 510 to 520 nm derived from emission of Mn tends to be high and the color purity of green tends to be high, and matching with a green filter becomes good and the loss becomes small as shown in the emission spectrum of the phosphor of the present invention as shown in FIG. 1. Further, it was confirmed that the correlation of the emission intensity ratio (P2/P1) with the Eu concentration shows substantially the same tendency even when P is Sr and/or Ca.

As mentioned above, when attention is focused on the distribution of the emission spectrum alone, it can be said that increase of Eu is primarily preferred, however, it is not necessarily preferred to limitlessly increase the Eu concentration in view of luminance.

Figure 4:
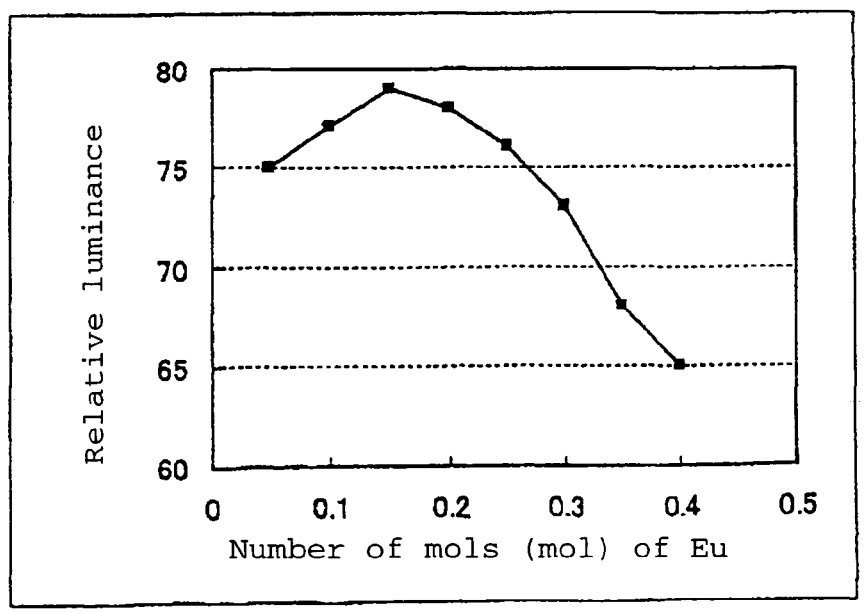
FIG. 4 is a figure illustrating the correlation of the emission luminance when a $Eu^{2+}$ and $Mn^{2+}$-co-activated barium magnesium aluminate phosphor is excited by ultraviolet rays having a wavelength of 185 nm, with the Eu concentration.

In FIG. 4, with reference to a $Eu^{2+}$ and $Mn^{2+}$-co-activated barium magnesium aluminate phosphor $\{(Ba_{1-x}Eu_x)O\cdot(Mg_{0.65}MnO_{0.35})O\cdot 5Al_2O_3\}$ wherein the Mn concentration is 0.35 mol (y=0.35), barium europium oxide is 1 mol (a=1) and aluminum oxide is 5 mol (b=5) as an example, a graph illustrating the relation between the Eu concentration (x value) of the phosphor and the emission luminance (relative value) when excited by ultraviolet rays having a wavelength of 185 nm is shown.

As evident from FIG. 4, the emission luminance of the $Eu^{2+}$ and $Mn^{2+}$-co-activated barium magnesium aluminate phosphor when excited by ultraviolet rays having a wavelength of 185 nm greatly depends on the Eu concentration. Although the emission luminance is high at a Eu concentration of from 0.05 to 0.25 mol (x=0.05 to 0.25), the emission luminance decreases at a higher Eu concentration.

Accordingly, as the condition which satisfies both high luminance and good matching with a color filter, the Eu concentration is from 0.05 to 0.25 mol (x=0.05 to 0.25), more preferably from 0.1 to 0.2 mol (x=0.1 to 0.2).

Further, correlation of the matrix composition and the Mn concentration with the luminance properties and the luminance-maintaining rate at a high Eu concentration, which is a characteristic of the aluminate phosphor of the present invention has been studied.

Figure 5:
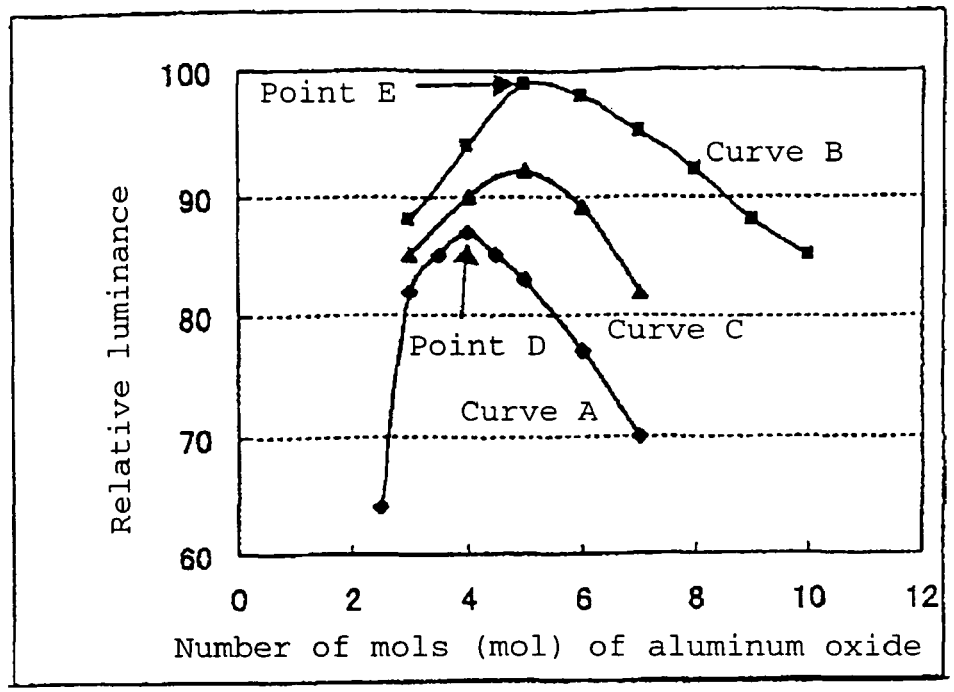
FIG. 5 is a figure illustrating the correlation of the emission luminance of a $Eu^{2+}$ and $Mn^{2+}$-co-activated barium magnesium aluminate phosphor, with the phosphor matrix composition.
Figure 6:
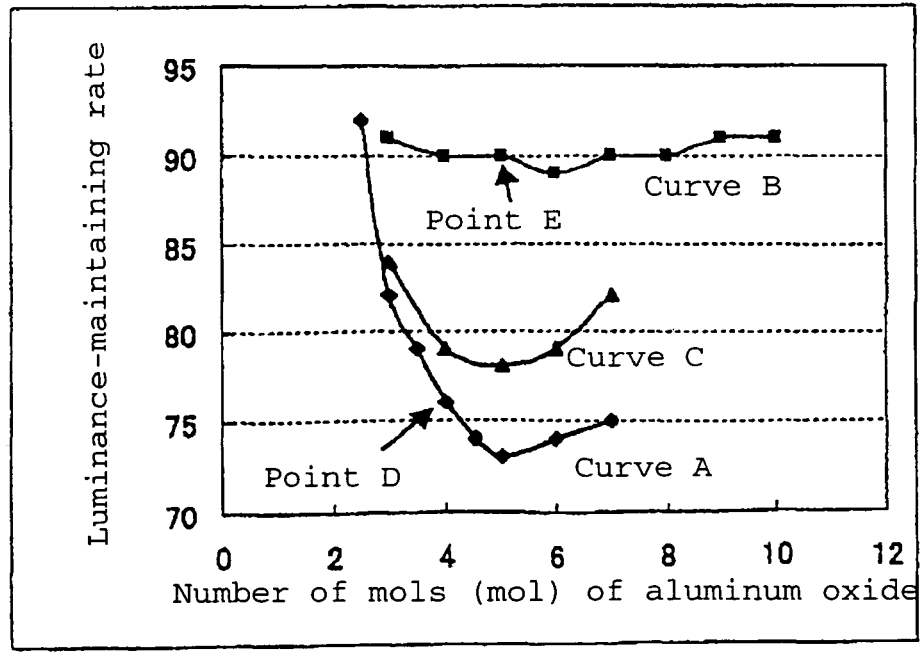
FIG. 6 is a figure illustrating the correlation of the luminance-maintaining rate of a $Eu^{2+}$ and $Mn^{2+}$-co-activated barium magnesium aluminate phosphor after a heat treatment, with the phosphor matrix composition.

In FIGS. 5 and 6, with reference to a $Eu^{2+}$ and $Mn^{2+}$-co-activated barium magnesium aluminate phosphor $\{a(Ba_{0.85}Eu_{0.15})O\cdot(Mg_{0.65}Mn_{0.35})O\cdot bAl_2O_3\}$ wherein the Eu concentration is 0.15 mol (x=0.15) and the Mn concentration is 0.35 mol (y=0.35) as an example, graphs illustrating the relation between the number of mols of aluminum oxide (b value) and the emission luminance (relative value), and the relation between the number of mols of aluminum oxide (b value) and the luminance-maintaining rate after a heat treatment, employing the number of mols of barium europium oxide (a value) of the phosphor as a parameter, are shown, respectively. In FIG. 6, the luminance-maintaining rate in the vertical axis is a relative value of the emission luminance after each phosphor shown in FIG. 5 is subjected to a heat treatment at 650° C. for 15 minutes relative to the emission luminance before the heat treatment. In FIGS. 5 and 6, the curves A, B and C are curves illustrating cases where barium europium oxide is 0.5 mol (a=0.5), 1 mol (a=1) and 1.5 mol (a=1.5), respectively, and the horizontal axis indicates the number of mols of aluminum oxide (b value).

As evident from FIG. 5, the emission luminance of the $Eu^{2+}$ and $Mn^{2+}$-co-activated barium magnesium aluminate phosphor greatly depends on the matrix composition of the phosphor. When the number of mols of barium europium oxide (a value) is constant, the emission luminance is highest when aluminum oxide is from 4 to 6 mol (b=4 to 6), and the emission luminance rapidly decreases when the b value becomes higher or smaller than this range. Further, when the number of mols of aluminum oxide (b value) is constant, the emission luminance is highest when barium europium oxide is substantially 1 mol (a=1), and the emission luminance rapidly decreases when the a value becomes higher or lower than this value. Particularly the emission luminance is highest when barium europium oxide is 1 mol (a=1) and aluminum oxide is 5 mol (b=5) (point E in FIG. 5).

Further, as evident from FIG. 6, the luminance-maintaining rate of the $Eu^{2+}$ and $Mn^{2+}$-co-activated barium magnesium aluminate phosphor also greatly depends on the matrix composition. When barium europium oxide is 1 mol (a=1), the luminance-maintaining rate does not substantially change depending on the number of mols of aluminum oxide, however, when barium europium oxide is 0.5 mol (a=0.5) or 1.5 mol (a=1.5), the luminance-maintaining rate is low when aluminum oxide is from 4 to 6 mol (b=4 to 6). Particularly when aluminum oxide is from 4 to 6 mol (b=4 to 6) at which the emission luminance is relatively high, the luminance-maintaining rate is highest when barium europium oxide is 1 mol (a=1), and the luminance-maintaining rate is so low as at most 80% when barium europium oxide is 0.5 mol (a=0.5) or 1.5 mol (a=1.5).

The phosphor as proposed in JP-A-2001-228319 and JP-B-52-22836 corresponds to the phosphor of the above compositional formula wherein barium europium oxide is 0.5 mol (a=0.5) and aluminum oxide is 4 mol (b=4, point D in FIGS. 5 and 6), and the phosphor as proposed in JP-A-56-152883 corresponds to the phosphor of the above compositional formula wherein barium europium oxide is 0.625 mol (a=0.625) and aluminum oxide is 6.67 mol (b=6.67). The emission luminance and the luminance-maintaining rate of these phosphors are compared in FIGS. 5 and 6, they are substantially poorer than the phosphor of the present invention (point E in FIGS. 5 and 6) wherein barium europium oxide is 1 mol (a=1) and aluminum oxide is 5 mol (b=5).

Figure 7:
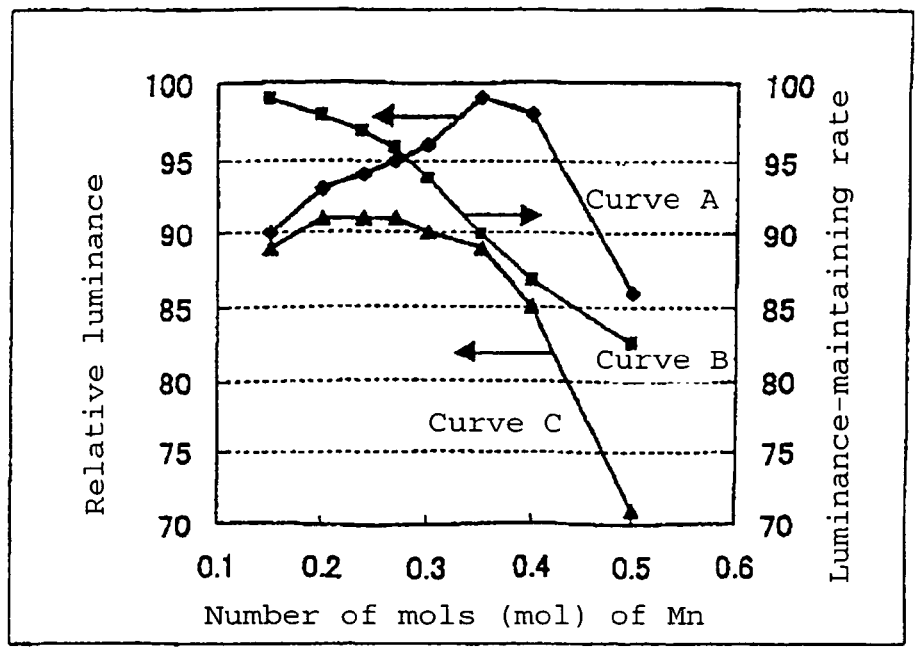
FIG. 7 is a figure illustrating the correlation of each of the emission luminance, the emission luminance after a heat treatment and the luminance-maintaining rate after a heat treatment of a $Eu^{2+}$ and $Mn^{2+}$-co-activated barium magnesium aluminate phosphor, with the Mn concentration.

In FIG. 7, with reference to a $Eu^{2+}$ and $Mn^{2+}$-co-activated alkaline earth barium magnesium aluminate phosphor $\{(Ba_{0.85}Eu_{0.15})O\cdot(Mg_{1-y}Mn_y)O\cdot5Al_2O_3\}$ wherein the Eu concentration is 0.15 mol (x=0.15), barium europium oxide is 1 mol (a=1) and aluminum oxide is 5 mol (b=5) as an example, a graph illustrating the relation of the Mn concentration (y value) of the phosphor to the emission luminance (relative value) and the luminance-maintaining rate is shown. In FIG. 7, the curve A illustrates the emission luminance (relative value) of the phosphor after production before a heat treatment, the curve C illustrates the emission luminance (relative value) after each phosphor shown by the curve A is subjected to a heat treatment at 650° C. for 15 minutes, and the curve B is a curve illustrating the luminance-maintaining rate after each phosphor shown by the curve A is subjected to a heat treatment at 650° C. for 15 minutes, that is, a curve illustrating the relative value of the emission luminance after the heat treatment to the emission luminance before the heat treatment under the above heat treatment condition of each phosphor. The horizontal axis indicates the manganese concentration (y value) and the vertical axis indicates the relative luminance (left horizontal axis) or the luminance-maintaining rate (bright horizontal axis).

As evident from FIG. 7, the emission luminance and heat deterioration properties of the luminance-maintaining rate of the $Eu^{2+}$ and $Mn^{2+}$-co-activated barium magnesium aluminate phosphor greatly depend on the Mn concentration. The emission luminance is highest at a Mn concentration of from 0.3 to 0.4 mol (y=0.3 to 0.4), and the emission luminance decreases when the Mn concentration becomes higher or lower than the above concentration. This is considered to be because the number of emission center is small when the Mn concentration is low, whereby the emission luminance tends to be low, and when the Mn concentration is too high on the contrary, the emission luminance tends to decrease due to concentration quenching.

Further, the relative luminance after the $Eu^{2+}$ and $Mn^{2+}$-co-activated barium magnesium aluminate phosphor is subjected to a heat treatment at 650° C. for 15 minutes, is substantially constant at a Mn concentration of at most 0.4 mol (y≦0.4). The luminance-maintaining rate decreases when the Mn concentration increases, however, it is found from FIG. 7 that it is at least 80% and is relatively high at a Mn concentration of at most 0.4 mol (y≦0.4).

Figure 8:
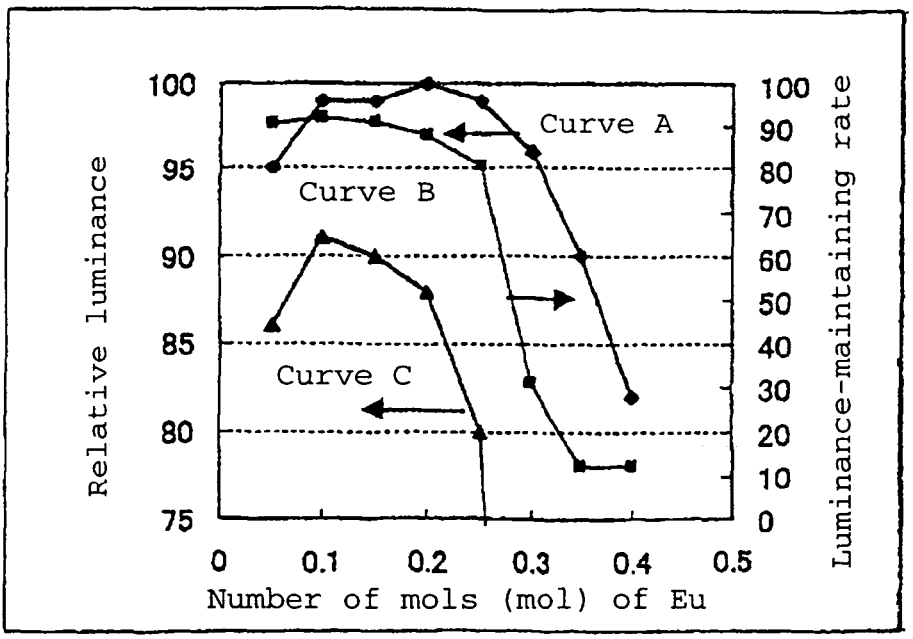
FIG. 8 is a figure illustrating the correlation of each of the emission luminance, the emission luminance after a heat treatment and the luminance-maintaining rate after a heat treatment of a $Eu^{2+}$ and $Mn^{2+}$-co-activated barium magnesium aluminate phosphor, with the Eu concentration.

In FIG. 8, with reference to a $Eu^{2+}$ and $Mn^{2+}$-co-activated barium magnesium aluminate phosphor $\{(Ba_{1-x}Eu_x)O\cdot(Mg_{0.65}MnO_{0.35})O\cdot5Al_2O_3\}$ wherein the Mn is 0.35 mol (y=0.35), barium europium oxide is 1 mol (a=1) and aluminum oxide concentration is 5 mol (b=5) as an example, a graph illustrating the relation of the Eu concentration (x value) of the phosphor to the emission luminance (relative value) and the luminance-maintaining rate is shown. Similar to FIG. 7, in FIG. 8, the curve A illustrates the emission luminance (relative value) of each phosphor after production, the curve C illustrates the emission luminance (relative value) after each phosphor shown in the curve A is subjected to a heat treatment at 650° C. for 15 minutes, and the curve B illustrates the luminance-maintaining rate of the emission luminance after each phosphor shown in the curve A is subjected to a heat treatment at 650° C. for 15 minutes (value obtained similarly in the case of the curve B in FIG. 7). The horizontal axis indicates the Eu concentration (x value), and the vertical axis indicates the relative luminance (left vertical axis) or the luminance-maintaining rate (right vertical axis).

As evident from FIG. 8, the emission luminance and the luminance-maintaining rate of the $Eu^{2+}$ and $Mn^{2+}$-co-activated barium magnesium aluminate phosphor greatly depend on the Eu concentration. The emission luminance is highest at a Eu concentration of from 0.05 to 0.25 mol (x=0.05 to 0.25), and the emission luminance decreases when the Eu concentration is higher or lower than the above concentration. This is considered to be because if the Eu concentration is low, the number of sites which absorb and transfer energy tends to be small, whereby the luminance tends to be low, and if the Eu concentration is too high on the contrary, the luminance tends to decrease due to concentration quenching.

Further, the relative luminance after the $Eu^{2+}$ and $Mn^{2+}$-co-activated barium magnesium aluminate phosphor is subjected to a heat treatment at 650° C. for 15 minutes is highest at a Eu concentration of from 0.05 to 0.15 mol (x=0.05 to 0.15). It is found from FIG. 8 that the luminance-maintaining rate decreases when a Eu concentration becomes high, however, it is at least 80% and is relatively high at the Eu concentration of at most 0.25 mol (x≦0.25). It is advantageous to make the concentration of the activators high within a range not to cause the concentration quenching as mentioned above in view of luminance saturation also.

Figure 9:
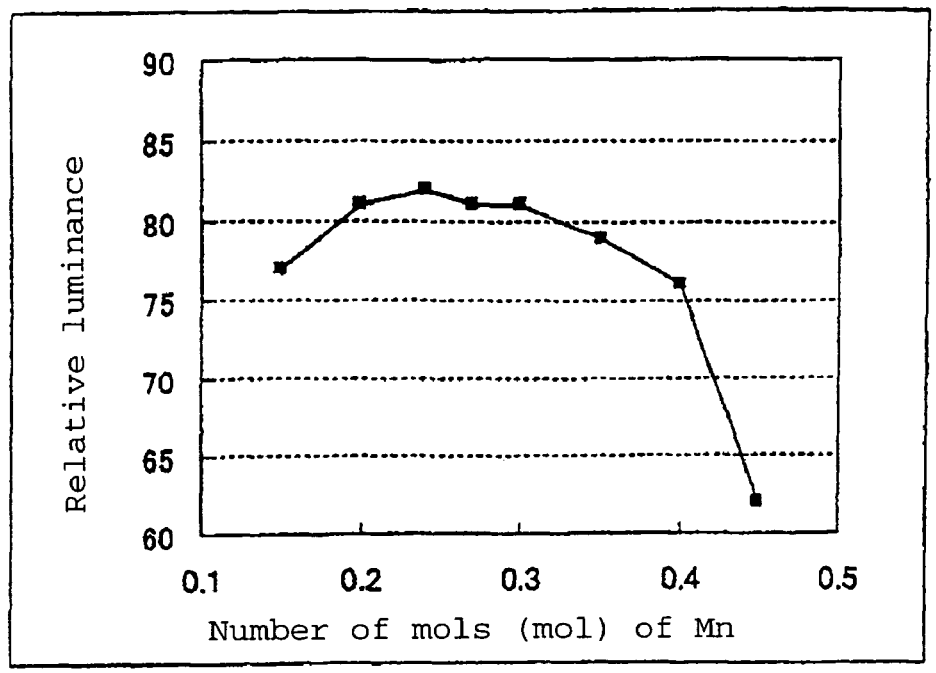
FIG. 9 is a figure illustrating the correlation of the emission luminance when a $Eu^{2+}$ and $Mn^{2+}$-co-activated barium magnesium aluminate phosphor is excited by ultraviolet rays having a wavelength of 185 nm, with the Mn concentration.

In FIG. 9, with reference to a $Eu^{2+}$ and $Mn^{2+}$-co-activated barium magnesium aluminate phosphor $\{(Ba_{0.85}Eu_{0.15})O \cdot (Mg_{1-y}Mn_y)O \cdot 5Al_2O_3\}$ wherein the Eu is 0.15mol (x=0.15), barium europium oxide is 1 mol (a=1) and aluminum oxide concentration is 5 mol (b=5) as an example, a graph illustrating the relation between the Mn concentration (y value) of the phosphor and the emission luminance (relative value) when excited by ultraviolet rays having a wavelength of 185 nm is shown.

As evident from FIG. 9, the emission luminance of the $Eu^{2+}$ and $Mn^{2+}$-co-activated barium magnesium aluminate phosphor when excited by ultraviolet rays having a wavelength of 185 nm greatly depends on the Mn concentration. The emission luminance is high at a Mn concentration of from 0.15 to 0.4 mol (y=0.15 to 0.4), and the emission luminance decreases when the Mn concentration is higher or lower than the above concentration.

Figure 10:
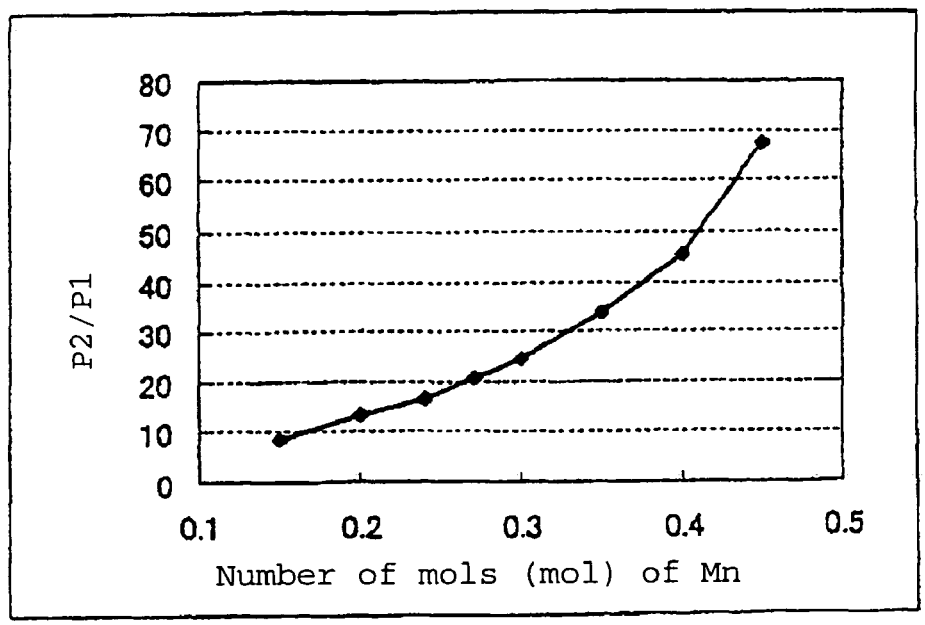
FIG. 10 is a figure illustrating the correlation of the ratio (P2/P1) of the emission peak intensity (P2) in a wavelength region of from 510 to 520 nm to the emission peak intensity (P1) in a wavelength region of from 445 to 455 nm in an emission spectrum of a $Eu^{2+}$ and $Mn^{2+}$-co-activated barium magnesium aluminate phosphor, with the Mn concentration.

In FIG. 10, with reference to a $Eu^{2+}$ and $Mn^{2+}$-co-activated alkaline earth barium magnesium aluminate phosphor $\{(Ba_{0.85}Eu_{0.15})O \cdot (Mg_{1-y}Mn_y)O \cdot 5Al_2O_3\}$ wherein the Eu is 0.15 mol (x=0.15), barium europium oxide is 1 mol (a=1) and aluminum oxide concentration is 5 mol (b=5) as an example, a graph illustrating the relation between the Mn concentration (y value) and the intensity ratio of two peaks (P2/P1) wherein P1 is the intensity of the first emission peak in a wavelength region of from 445 to 455 nm and P2 is the intensity of the second emission peak in a wavelength region of from 510 to 520 nm in the emission spectrum of the phosphor is shown. A high P2/P1 value means that the emission of a blue component in a wavelength region of from 445 to 455 nm tends to be weak and the emission of a green component in a wavelength region of from 510 to 520 nm is intense, and it is indicated that as a green phosphor, the higher P2/P1, the higher the color purity of green, and the better the matching with a green filter.

As evident from FIG. 10, the peak intensity ratio (P2/P1) of the $Eu^{2+}$ and $Mn^{2+}$-co-activated barium magnesium aluminate phosphor greatly depends on the Mn concentration. The intensity ratio P2/P1 is at least 10 at a Mn concentration of at least 0.2 mol (y≧0.2), and the higher the Mn concentration, the higher this value. When the Mn concentration is high, the energy transferred from Eu to Mn can easily be converted to visible light, whereby emission in a wavelength region of from 510 to 520 nm derived from emission of Mn tends to be intense, and the purity of green tends to be high.

As a result, with respect to the phosphor of the present invention, it is preferred that the molar ratio (a) of $\{(P_{1-x}Eu_x)O\}$ relative to $\{(Q_{1-y}Mn_y)O\}$ is within a range of from 0.8 to 1.2 (0.8≦a≦1.2) and the molar ratio (b) of aluminum oxide relative to magnesium manganese oxide is within a range of from 4.5 to 5.5 (4.5≦b≦5.5) in view of high emission luminance under excitation by ultraviolet rays having a wavelength of 253.7 nm and a low degree of heat deterioration even after a heat treatment at 650° C. for 15 minutes. Further, in addition to the above composition of the matrix, it is preferred that the Eu concentration (x) and the Mn concentration (y) as the activators are within ranges of from 0.05 to 0.25 mol (0.05≦x≦0.25) and from 0.2 to 0.4 mol (0.2≦y≦0.4), respectively, in view of high emission luminance under excitation by ultraviolet rays having a wavelength of 253.7 nm and a wavelength of 185 nm, a low degree of heat deterioration by a heat treatment at 650° C. for 15 minutes, and the emission color being more green. A more preferred green light emitting phosphor for a cold cathode fluorescent lamp can be obtained by specifying the composition of the matrix and the Mn concentration adjusting to the setting of the Eu concentration as mentioned above.

Now, the cold cathode fluorescent lamp of the present invention will be explained. The cold cathode fluorescent lamp of the present invention is the same as a the conventional cold cathode fluorescent lamp except that the fluorescent layer formed on the inner wall of the glass tube contains the above phosphor of the present invention. Namely, it is produced in such a manner that a phosphor slurry comprising the phosphor of the present invention together with a binder such as polyethylene oxide or nitrocellulose dispersed in a solvent such as water or butyl acetate is absorbed in a light transmitting slender tube of e.g. glass and coated on the inner wall of the tube, followed by drying and baking treatment, and then a couple of electrodes is attached to a predetermined position, the inside of the tube is evacuated, and rare gas such as argon-neon (Ar—Ne) and mercury vapor are sealed in the tube, and both ends of the tube are sealed. The electrodes are attached to both ends of the tube in the same manner as a conventional cold cathode fluorescent lamp.

As the $Eu^{2+}$ and $Mn^{2+}$-co-activated alkaline earth aluminate phosphor (the phosphor of the present invention) used as the fluorescent layer of the cold cathode fluorescent lamp of the present invention, when a phosphor having a relatively large particle size as compared with a conventionally employed phosphor for a fluorescent lamp is used, the luminous flux from the obtained cold cathode fluorescent lamp increases, and a cold cathode fluorescent lamp exhibiting emission with higher luminance can be obtained. This is because heat deterioration of the phosphor tends to be small when the particle size of the phosphor of the present invention is large. Accordingly, as a phosphor to be used for the cold cathode fluorescent lamp of the present invention, among the phosphors of the present invention, it is particularly preferred to use a phosphor having a particle size of at least about 2 μm as represented by the average particle size measured by an air transmission method by using a Fisher Subsieve Sizer for example, in view of the luminous flux of the obtained cold cathode fluorescent lamp. Further, it is particularly preferred to use a phosphor having a particle size of 8 μm in view of the outer appearance (surface texture or granular structures of the fluorescent layer) of the cold cathode fluorescent lamp and further, the adhesion strength of the fluorescent layer.

The cold cathode fluorescent lamp of the present invention produced as mentioned above can be used as a back light with high luminance and with a wide color reproduction range.

Now, the present invention will be explained in further detail with reference to Examples. However, the present invention is by no means restricted to such specific Examples.

EXAMPLE 1

| | |
|---|---|
| $BaCO_3$ | 0.85 mol |
| $Eu_2O_3$ | 0.075 mol |
| $3MgCO_3 \cdot Mg(OH)_2$ | 0.1625 mol |

-continued

| | |
|---|---|
| MnO$_2$ | 0.35 mol |
| Al$_2$O$_3$ (α type) | 5.0 mol |
| AlF$_3$ | 0.030 mol |

The above materials as the phosphor materials were thoroughly mixed and filled in a crucible, a block of graphite was put on the phosphor materials, and a cover was put, followed by baking in a nitrogen and hydrogen atmosphere containing water vapor at a maximum temperature of 1,450° C. over a period of 24 hours including the temperature raising time.

Then, the baked powder was dispersed, washed, dried and sieved to obtain a Eu$^{2+}$ and Mn$^{2+}$-co-activated barium magnesium aluminate phosphor of Example 1 having a compositional formula of $(Ba_{0.85}Eu_{0.15})(Mg_{0.65}Mn_{0.35}).5Al_2O_3$ and having an average particle size of 6.7 μm as measured by a Fisher Subsieve Sizer. Here, AlF$_3$ is a flux which is commonly used for production of a phosphor.

The emission spectrum of the phosphor of Example 1 had emission peaks at 452 nm and 516 nm, the intensity ratio of the two peaks (P2/P1) was 36.8 wherein P1 is the intensity of the emission peak at 452 nm and P2 is the intensity of the emission peak at 516 nm, the luminescent chromaticity of the emission color by CIE color system was x=0.140 and y=0.717, and the emission color was practical as a green phosphor.

The phosphor of Example 1 was irradiated with ultraviolet rays of 253.7 nm and the emission luminance was measured, whereupon it was 106% of that of a LAP phosphor measured under the same conditions.

Further, the green phosphor of Example 1 was subjected to a heat treatment in an air atmosphere at 650° C. for 15 minutes, and then it was irradiated with ultraviolet rays having a wavelength of 253.7 nm similarly, and the emission luminance was measured, whereupon it was 96.2% of the emission luminance before the heat treatment, and heat deterioration due to the heat treatment was small.

Then, 100 parts by weight of a mixture comprising the phosphor (green emitting component phosphor) of Example 1, a trivalent europium (Eu$^{3+}$)-activated yttrium oxide phosphor (red emitting component phosphor) and a Eu$^{2+}$-activated barium magnesium aluminate phosphor (blue emitting component phosphor) was thoroughly mixed with 200 parts by weight of butyl acetate containing 1.1% nitrocellulose and 0.7 part by weight of a borate type binder to prepare a phosphor slurry, the phosphor slurry was coated on the inner surface of a glass bulb having a tube outer diameter of 2.6 mm, a tube inner diameter of 2.0 mm and a tube length of 250 mm and dried, followed by a baking treatment at 650° C. for 15 minutes, and then a mixed gas of 5 mg of mercury and Ne—Ar was sealed in the bulb under a sealing pressure of about 10 kPa and then electrodes were attached to produce a cold cathode fluorescent lamp of Example 1 with a lamp current of 6 mA. For the cold cathode fluorescent lamp, the mixture ratio of the phosphor of Example 1, the Eu$^{3+}$-activated yttrium oxide phosphor and the Eu$^{2+}$-activated barium magnesium aluminate phosphor was adjusted so that the luminescent chromaticity would be x=0.310 and y=0.320.

The luminous flux of the cold cathode fluorescent lamp of Example 1 was 101.7% of the luminous flux of the cold cathode fluorescent lamp of the following Comparative Example 3 produced in the same manner except that a LAP phosphor was used instead of the phosphor of Example 1 as the green emitting component phosphor.

EXAMPLE 2

| | |
|---|---|
| BaCO$_3$ | 0.855 mol |
| Eu$_2$O$_3$ | 0.0475 mol |
| 3MgCO$_3$·Mg(OH)$_2$ | 0.15 mol |
| MnO$_2$ | 0.4 mol |
| Al$_2$O$_3$ (α type) | 4.75 mol |
| AlF$_3$ | 0.030 mol |

The same operation as in Example 1 was carried out except that the above materials were used as the phosphor materials to obtain a Eu$^{2+}$ and Mn$^{2+}$-co-activated barium magnesium aluminate phosphor of Example 2 having a compositional formula of $0.95(Ba_{0.9}Eu_{0.1})(Mg_{0.6}Mn_{0.4}).4.75Al_2O_3$ and having an average particle size of 7.0 μm as measured by a Fisher Subsieve Sizer.

The emission spectrum of the phosphor of Example 2 had emission peaks at 450 nm and 516 nm, the intensity ratio of the two peaks (P2/P1) was 50.2 wherein P1 is the intensity of the emission peak at 450 nm and P2 is the intensity of the emission peak at 516 nm, and the emission color was practical as a green phosphor with luminescent chromaticity by CIE color system of x=0.141 and y=0.724.

The phosphor of Example 2 was irradiated with ultraviolet rays of 253.7 nm and the emission luminance was measured, whereupon it was 99% of that of a LAP phosphor measured under the same conditions.

Further, the green phosphor of Example 2 was subjected to a heat treatment in an air atmosphere at 650° C. for 15 minutes, and then it was irradiated with ultraviolet rays having a wavelength of 253.7 nm similarly, and the emission luminance was measured, whereupon it was 100% of the emission luminance of the phosphor of Example 2 before the heat treatment, and substantially no heat deterioration due to the heat treatment was confirmed.

Then, the same operation as in Example 1 was carried out except that the phosphor of Example 2 was used instead of the phosphor of Example 1 to produce a cold cathode fluorescent lamp of Example 2 with luminescent chromaticity of the emission color by CIE color system of x=0.310 and y=0.320.

The luminous flux of the cold cathode fluorescent lamp of Example 2 was 100% of the luminous flux of the cold cathode fluorescent lamp of the following Comparative Example 3 produced in the same manner except that a LAP phosphor was used instead of the phosphor of Example 2 as the green emitting component phosphor.

EXAMPLE 3

| | |
|---|---|
| BaCO$_3$ | 0.84 mol |
| Eu$_2$O$_3$ | 0.105 mol |
| 3MgCO$_3$·Mg(OH)$_2$ | 0.2 mol |
| MnO$_2$ | 0.2 mol |
| Al$_2$O$_3$ (α type) | 5.25 mol |
| AlF$_3$ | 0.020 mol |

The same operation as in Example 1 was carried out except that the above materials were used as the phosphor materials to obtain a Eu$^{2+}$ and Mn$^{2+}$-co-activated barium magnesium aluminate phosphor of Example 3 having a compositional formula of $1.05(Ba_{0.8}Eu_{0.2})(Mg_{0.8}Mn_{0.2}).5.25Al_2O_3$ and having an average particle size of 7.0 μas measured by a Fisher Subsieve Sizer.

The emission spectrum of the phosphor of Example 3 had emission peaks at 454 nm and 515 nm, the intensity ratio of the two peaks (P2/P1) was 14.5 wherein P1 is the intensity of the emission peak at 454 nm and P2 is the intensity of the emission peak at 515 nm, the luminescent chromaticity was x=0.140 and y=0.634, and the emission color was practical as a green phosphor.

The phosphor of Example 3 was irradiated with ultraviolet rays of 253.7 nm and the emission luminance was measured, whereupon it was 99% of that of a LAP phosphor measured under the same conditions.

Further, the green phosphor of Example 3 was subjected to a heat treatment in an air atmosphere at 650° C. for 15 minutes, and then it was irradiated with ultraviolet rays having a wavelength of 253.7 nm similarly, and the emission luminance was measured, whereupon it was 98% of the emission luminance of the phosphor of Example 3 before the heat treatment, and the heat deterioration due to the heat treatment was small.

Then, the same operation as in Example 1 was carried out except that the phosphor of Example 3 was used instead of the phosphor of Example 1 to produce a cold cathode fluorescent lamp of Example 3 with luminescent chromaticity of the emission color by CIE color system of x=0.310 and y=0.320.

The luminous flux of the cold cathode fluorescent lamp of Example 3 was 99.9% of the luminous flux of the cold cathode fluorescent lamp of the following Comparative Example 3 produced in the same manner except that a LAP phosphor was used instead of the phosphor of Example 3 as the green emitting component phosphor.

EXAMPLE 4

| | |
|---|---|
| $BaCO_3$ | 0.95 mol |
| $Eu_2O_3$ | 0.025 mol |
| $3MgCO_3 \cdot Mg(OH)_2$ | 0.2 mol |
| $MnO_2$ | 0.2 mol |
| $Al_2O_3$ (α type) | 4.75 mol |
| $AlF_3$ | 0.030 mol |

The same operation as in Example 1 was carried out except that the above materials were used as the phosphor materials to obtain a $Eu^{2+}$ and $Mn^{2+}$-co-activated barium magnesium aluminate phosphor of Example 4 having a compositional formula of $(Ba_{00.95}Eu_{0.05})(Mg_{0.8}Mn_{0.2}).4.75Al_2O_3$ and having an average particle size of 6.5 μm as measured by a Fisher Subsieve Sizer.

The emission spectrum of the phosphor of Example 4 had emission peaks at 448 nm and 515 nm, the intensity ratio of the two peaks (P2/P1) was 10.5 wherein P1 is the intensity of the emission peak at 448 nm and P2 is the intensity of the emission peak at 515 nm, the luminescent chromaticity was x=0.140 and y=0.598, and the emission color was practical as a green phosphor.

The phosphor of Example 4 was irradiated with ultraviolet rays of 253.7 nm and the emission luminance was measured, whereupon it was 87% of that of a LAP phosphor measured under the same conditions.

Further, the green phosphor of Example 4 was subjected to a heat treatment in an air atmosphere at 650° C. for 15 minutes, and then it was irradiated with ultraviolet rays having a wavelength of 253.7 nm similarly, and the emission luminance was measured, whereupon it was 100% of the emission luminance of the phosphor of Example 4 before the heat treatment, and substantially no heat deterioration due to the heat treatment was confirmed.

Then, the same operation as in Example 1 was carried out except that the phosphor of Example 4 was used instead of the phosphor of Example 1 to produce a cold cathode fluorescent lamp of Example 4 with luminescent chromaticity of the emission color by CIE color system of x=0.310 and y=0.320.

The luminous flux of the cold cathode fluorescent lamp of Example 4 was 96.9% of the luminous flux of the cold cathode fluorescent lamp of the following Comparative Example 3 produced in the same manner except that a LAP phosphor was used instead of the phosphor of Example 4 as the green emitting component phosphor.

EXAMPLE 5

| | |
|---|---|
| $BaCO_3$ | 0.85 mol |
| $Eu_2O_3$ | 0.075 mol |
| $3MgCO_3 \cdot Mg(OH)_2$ | 0.1625 mol |
| $MnO_2$ | 0.35 mol |
| $Al_2O_3$ (α type) | 5.0 mol |
| $AlF_3$ | 0.010 mol |

The same operation as in Example 1 was carried out except that the above materials were used as the phosphor materials to obtain a $Eu^{2+}$ and $Mn^{2+}$-co-activated barium magnesium aluminate phosphor of Example 5 having a compositional formula of $(Ba_{0.85}Eu_{0.15})(Mg_{0.65}Mn_{0.35}).5Al_2O_3$ and having an average particle size of 2.7 μm as measured by a Fisher Subsieve Sizer.

The emission spectrum of the phosphor of Example 5 had emission peaks at 449 nm and 514 nm, the intensity ratio of the two peaks (P2/P1) was 47.7 wherein P1 is the intensity of the emission peak at 449 nm and P2 is the intensity of the emission peak at 514 nm, the luminescent chromaticity of the emission color by CIE color system was x=0.140 and y=0.710, and the emission color was practical as a green phosphor.

The phosphor of Example 5 was irradiated with ultraviolet rays of 253.7 nm and the emission luminance was measured, whereupon it was 105% of that of a LAP phosphor measured under the same conditions.

Further, the green phosphor of Example 5 was subjected to a heat treatment in an air atmosphere at 650° C. for 15 minutes, and then it was irradiated with ultraviolet rays having a wavelength of 253.7 nm similarly, and the emission luminance was measured, whereupon it was 95.1% of the emission luminance of the phosphor of Example 5 before the heat treatment, and heat deterioration was very small.

Then, the same operation as in Example 1 was carried out except that the phosphor of Example 5 were used instead of the phosphor of Example 1 to produce a cold cathode fluorescent lamp of Example 5 with luminescent chromaticity of the emission color by CIE color system of x=0.310 and y=0.320.

The luminous flux of the cold cathode fluorescent lamp of Example 5 was 100.1% of the luminous flux of the cold cathode fluorescent lamp of the following Comparative Example 3 produced in the same manner except that a LAP phosphor was used instead of the phosphor of Example 5 as the green emitting component phosphor.

COMPARATIVE EXAMPLE 1

| | |
|---|---|
| $BaCO_3$ | 0.45 mol |
| $Eu_2O_3$ | 0.025 mol |
| $3MgCO_3 \cdot Mg(OH)_2$ | 0.2 mol |
| $MnO_2$ | 0.2 mol |
| $Al_2O_3$ (α type) | 4.0 mol |
| $AlF_3$ | 0.005 mol |

The same operation as in Example 1 was carried out except that the above materials were used as the phosphor materials to obtain a $Eu^{2+}$ and $Mn^{2+}$-co-activated barium magnesium aluminate phosphor of Comparative Example 1 having a compositional formula of $0.5(Ba_{0.9}Eu_{0.1})(Mg_{0.8}Mn_{0.2}) \cdot 4Al_2O_3$ as disclosed in JP-B-52-22836 and having an average particle size of 2.5 μm as measured by a Fisher Subsieve Sizer.

The emission spectrum of the phosphor of Comparative Example 1 had emission peaks at 450 nm and 515 nm, the intensity ratio of the two peaks (P2/P1) was 12.3 wherein P1 is the intensity of the emission peak at 450 nm and P2 is the intensity of the emission peak at 515 nm, the luminescent chromaticity was x=0.140 and y=0.603, and the emission color was practical as a green phosphor.

The phosphor of Comparative Example 1 was irradiated with ultraviolet rays of 253.7 nm and the luminance was measured, whereupon it was 77% of the emission luminance of a LAP phosphor measured under the same conditions.

Further, the green phosphor of Comparative Example 1 was subjected to a heat treatment in an air atmosphere at 650° C. for 15 minutes, and then it was irradiated with ultraviolet rays having a wavelength of 253.7 nm similarly, and the emission luminance was measured, whereupon it was 74% of the emission luminance of the phosphor of Comparative Example 1 before the heat treatment, and heat deterioration of the emission luminance due to the heat treatment was significant.

Then, the same operation as in Example 1 was carried out except that the phosphor of Comparative Example 1 was used instead of the phosphor of Example 1 to produce a cold cathode fluorescent lamp of Comparative Example 1 with luminescent chromaticity of the emission color by CIE color system of x=0.310 and y=0.320.

The luminous flux of the cold cathode fluorescent lamp of Comparative Example 1 was 87.7% of the luminous flux of the cold cathode fluorescent lamp of the following Comparative Example 3 produced in the same manner except that a LAP phosphor was used instead of the phosphor of Comparative Example 1 as the green emitting component phosphor.

COMPARATIVE EXAMPLE 2

| | |
|---|---|
| $BaCO_3$ | 0.5825 mol |
| $Eu_2O_3$ | 0.02125 mol |
| $3MgCO_3 \cdot Mg(OH)_2$ | 0.208 mol |
| $MnO_2$ | 0.168 mol |
| $Al_2O_3$ (α type) | 6.67 mol |
| $AlF_3$ | 0.010 mol |

The same operation as in Example 1 was carried out except that the above materials were used as the phosphor materials to obtain a $Eu^{2+}$ and $Mn^{2+}$-co-activated barium magnesium aluminate phosphor of Comparative Example 2 having a compositional formula of $0.625 (Ba_{0.932}Eu_{0.068})(Mg_{0.832}Mn_{0.168}) \cdot 6.67Al_2O_3$ as disclosed in JP-A-56-152883 and having an average particle size of 2.9 pm as measured by a Fisher Subsieve Sizer.

The emission spectrum of the phosphor of Comparative Example 2 had emission peaks at 470 nm and 509 nm, and the intensity ratio of the two peaks (P2/P1) was 7.5 wherein P1 is the intensity of the emission peak at 470 nm and P2 is the intensity of the emission peak at 509 nm, and the luminescent chromaticity of the emission color by CIE color system was x=0.146 and y=0.540, and the emission color is not practical as a green phosphor. Further, the peak of the blue emission is at a relatively long wavelength side, and if the phosphor is used as a blue emission component of a fluorescent lamp for a back light, the color production properties are decreased, such being impractical.

The phosphor of Comparative Example 2 was irradiated with ultraviolet rays of 253.7 nm and the luminance was measured, whereupon it was 65% of the emission luminance of a LAP phosphor measured under the same conditions.

Further, the green phosphor of Comparative Example 2 was subjected to a heat treatment in an air atmosphere at 650° C. for 15 minutes, and then it was irradiated with ultraviolet rays having a wavelength of 253.7 nm similarly, and the emission luminance was measured, whereupon it was 75% of the emission luminance of the phosphor of Comparative Example 2 before the heat treatment, and heat deterioration due to the heat treatment was significant.

Then, the same operation as in Example 1 was carried out except that the phosphor of Comparative Example 2 was used instead of the phosphor of Example 1 to produce a cold cathode fluorescent lamp of Comparative Example 2with luminescent chromaticity of x=0.310 and y=0.320.

The luminous flux of the cold cathode fluorescent lamp of Comparative Example 2 was 84.3% of the luminous flux of the cold cathode fluorescent lamp of the following Comparative Example 3 produced in the same manner except that a LAP phosphor was used instead of the phosphor of Comparative Example 2 as the green emitting component phosphor.

COMPARATIVE EXAMPLE 3

A cold cathode fluorescent lamp of Comparative Example 3 with luminescent chromaticity of x=0.310 and y=0.320 was produced in the same manner as in production of the cold cathode fluorescent lamp of Example 1 except that a LAP phosphor {a LAP phosphor having a compositional formula of $(La_{0.55}Ce_{0.3}Tb_{0.15})PO_4$} which is representative as a green component phosphor of a phosphor for a fluorescent lamp was used instead of the phosphor of Example 1, and employed for comparison of emission properties with the cold cathode fluorescent lamps of the present invention.

The entire disclosures of Japanese Patent Application No. 2003-285174 filed on Aug. 1, 2003 and Japanese Patent Application No. 2004-178510 filed on Jun. 16, 2004 including specifications, claims, drawings and summaries are incorporated herein by reference in their entireties.

What is claimed is:

1. A green light-emitting alkaline earth aluminate phosphor for a cold cathode fluorescent lamp, which is represented by the compositional formula

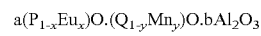

and which emits green light when irradiated with ultraviolet rays having a wavelength of from 180 to 300 nm, wherein P represents at least one alkaline earth metal element selected from the group consisting of Ba, Sr and Ca, Q represents at least one bivalent metal element selected from the group consisting of Mg and Zn, and a, b, x and y represent numbers which satisfy the following relationships;

$0.8 \leq a \leq 1.2$,
$4.5 \leq b \leq 5.5$,
$0.05 \leq x \leq 0.25$,
$0.2 \leq y \leq 0.4$, wherein said green light-emitting alkaline earth aluminate phosphor emits light having a first emission peak as a minor emission peak in a wavelength region of from 445 to 455 nm and having a second emission peak as a major emission peak in a wavelength region of from 510 to 520 nm, when irradiated with ultraviolet rays having a wavelength of from 180 to 300 nm, and wherein when the intensity of the above first emission peak and the intensity of the above second emission peak are represented as P1 and P2, respectively, the intensity ratio (P2/P1) is at least 14.5.

2. A cold cathode fluorescent lamp, which comprises
a tubular envelop transparent to light,
a fluorescent layer formed on the inner wall of the envelope, and
mercury and rare gas sealed in the envelop so that the fluorescent layer emits light by ultraviolet rays having a wavelength of from 180 to 300 nm radiated by discharge of mercury, and wherein the fluorescent layer comprises the green light-emitting alkaline earth aluminate phosphor for a cold cathode fluorescent lamp as defined in claim 1.

3. The green light-emitting alkaline earth aluminate phosphor for a cold cathode fluorescent lamp according to claim 1, wherein $0.1 < x \leq 0.25$.

4. A green light-emitting alkaline earth aluminate phosphor for a cold cathode fluorescent lamp, which comprises an alkaline earth aluminate as a matrix and contains bivalent europium ($Eu^{2+}$) and bivalent manganese ($Mn^{2+}$) as activators, and wherein the phosphor has a property that when it is excited by ultraviolet rays having a wavelength of 253.7 nm, the emission luminance after the phosphor is subjected to a heat treatment at 650° C. for 15 minutes is at least 80% of the emission luminance before the heat treatment.

5. The green light-emitting alkaline earth aluminate phosphor for a cold cathode fluorescent lamp according to claim 4, wherein the phosphor is represented by the compositional formula $a(P_{1-x}Eu_x)O \cdot (Q_{1-y}Mn_y)O \cdot bAl_2O_3$ wherein P represents at least one alkaline earth metal element selected from the group consisting of Ba, Sr and Ca, Q represents at least one bivalent metal element selected from the group consisting of Mg and Zn, and a, b, x and y represent numbers which satisfy the following relationships:

$0.8 \leq a \leq 1.2$,
$4.5 \leq b \leq 5.5$,
$0.05 \leq x \leq 0.25$ and
$0.2 \leq y \leq 0.4$.

6. A cold cathode fluorescent lamp, which comprises
a tubular envelop transparent to light,
a fluorescent layer formed on the inner wall of the envelope, and
mercury and rare gas sealed in the envelop so that the fluorescent layer emits light by ultraviolet rays having a wavelength of from 180 to 300 nm radiated by discharge of mercury, and wherein the fluorescent layer comprises a green light-emitting alkaline earth aluminate phosphor for a cold cathode fluorescent lamp, which is represented by the compositional formula $a(P_{1-x}Eu_x)O \cdot (Q_{1-y}Mn_y)O \cdot bAl_2O_3$ and which emits green light when irradiated with ultraviolet rays having a wavelength of from 180 to 300 nm, wherein P represents at least one alkaline earth metal element selected from the group consisting of Ba, Sr and Ca, Q represents at least one bivalent metal element selected from the group consisting of Mg and Zn, and a, b, x and y represent numbers which satisfy the following relationships:

$0.8 \leq a \leq 1.2$,
$4.5 \leq b \leq 5.5$,
$0.1 \leq x \leq 0.25$,
$0.2 \leq y \leq 0.4$.

7. A green light-emitting alkaline earth aluminate phosphor for a cold cathode fluorescent lamp, which is represented by the compositional formula $a(P_{1-x}Eu_x)O \cdot (Q_{1-y}Mn_y)O \cdot bAl_2O_3$ and which emits green light when irradiated with ultraviolet rays having a wavelength of from 180 to 300 nm, wherein P represents at least one alkaline earth metal element selected from the group consisting of Ba, Sr and Ca, Q represents at least one bivalent metal element selected from the group consisting of Mg and Zn, and a, b, x and y represent numbers which satisfy the following relationships:

$0.8 \leq a \leq 1.2$,
$4.5 \leq b \leq 5.5$,
$0.15 \leq x \leq 0.25$,
$0.2 \leq y \leq 0.4$.

8. A green light-emitting alkaline earth aluminate phosphor for a cold cathode fluorescent lamp, which is represented by the compositional formula $a(P_{1-x}Eu_x)O \cdot (Q_{1-y}Mn_y)O \cdot bAl_2O_3$ and which emits green light when irradiated with ultraviolet rays having a wavelength of from 180 to 300 nm, wherein P represents at least one alkaline earth metal element selected from the group consisting of Ba, Sr and Ca, Q represents at least one bivalent metal element selected from the group consisting of Mg and Zn, and a, b, x and y represent numbers which satisfy the following relationships:

$0.8 \leq a \leq 1.2$,
$4.5 \leq b \leq 5.5$,
$0.05 \leq x \leq 0.25$,
$0.35 \leq y \leq 0.4$.

* * * * *